United States Patent
Rahbar

(10) Patent No.: US 8,774,227 B2
(45) Date of Patent: Jul. 8, 2014

(54) MULTI INPUT TIMING RECOVERY OVER PACKET NETWORK

(75) Inventor: Kamran Rahbar, Kanata (CA)

(73) Assignee: Microsemi Semiconductor ULC, Kanata, Ontario (CA)

( * ) Notice: Subject to any disclaimer, the term of this patent is extended or adjusted under 35 U.S.C. 154(b) by 273 days.

(21) Appl. No.: 12/773,622

(22) Filed: May 4, 2010

(65) Prior Publication Data

US 2010/0296524 A1    Nov. 25, 2010

(30) Foreign Application Priority Data

May 22, 2009   (GB) .................................. 0908883.2

(51) Int. Cl.
*H04J 3/06*       (2006.01)
*H04L 7/033*      (2006.01)
*H04L 12/56*      (2006.01)
*H04L 12/26*      (2006.01)

(52) U.S. Cl.
CPC ............. *H04J 3/0667* (2013.01); *H04J 3/0679* (2013.01); *H04J 3/0682* (2013.01); *H04J 3/0644* (2013.01); *H04L 7/0331* (2013.01); *H04L 47/283* (2013.01); *H04L 43/106* (2013.01); *H04L 43/087* (2013.01)
USPC ....... 370/503; 370/395.62; 370/516; 375/226

(58) Field of Classification Search
CPC ........................................ H04J 3/0635–3/0697
USPC .................................................. 375/350, 229
IPC .................... H04J 3/066, 3/067; H04L 12/2657
See application file for complete search history.

(56) References Cited

U.S. PATENT DOCUMENTS

| | | | |
|---|---|---|---|
| 4,027,263 A * | 5/1977 | Bittel et al. ..................... | 327/91 |
| 5,767,746 A | 6/1998 | Dieterich | |
| 6,259,677 B1 * | 7/2001 | Jain ............................... | 370/252 |
| 7,440,474 B1 | 10/2008 | Goldman et al. | |
| 2004/0062278 A1 * | 4/2004 | Hadzic et al. ................. | 370/503 |
| 2004/0125822 A1 * | 7/2004 | Jun et al. ....................... | 370/503 |
| 2006/0146865 A1 * | 7/2006 | Crowle et al. ................. | 370/463 |

(Continued)

FOREIGN PATENT DOCUMENTS

| | | |
|---|---|---|
| GB | 2391771 A | 2/2004 |
| GB | 2436421 | 9/2007 |

OTHER PUBLICATIONS

Paul M. Embre et al. "C++ Algorithms for Digital Signal Processing", Nov. 1998, Prentice Hall, Second Edition, p. 186, and generally section 4.2.*

(Continued)

*Primary Examiner* — Asad Nawaz
*Assistant Examiner* — Zhaohui Yang
(74) *Attorney, Agent, or Firm* — Marks & Clerk; Richard J. Mitchell

(57) ABSTRACT

In a method of recovering timing information over packet networks, a receiver receives a plurality of packet streams over different paths from the same source. The raw delays experienced by the timing packets for each stream are filtered to provide a filtered delay for each stream. The filtered delays are weighted based on the quality of each stream, and the weighted filtered delays are then combined to form an aggregate delay estimate. Frequency adjustments for a local clock at the receiver are derived from the aggregate delay estimate.

14 Claims, 3 Drawing Sheets

(56) References Cited

U.S. PATENT DOCUMENTS

| | | | |
|---|---|---|---|
| 2007/0223484 A1* | 9/2007 | Crowle et al. | 370/394 |
| 2008/0080563 A1* | 4/2008 | Kataria et al. | 370/503 |
| 2008/0225897 A1* | 9/2008 | Bryant et al. | 370/503 |
| 2009/0141743 A1 | 6/2009 | Harrison | |
| 2010/0123471 A1* | 5/2010 | Olgaard et al. | 324/754 |
| 2010/0278055 A1* | 11/2010 | Barry et al. | 370/252 |

OTHER PUBLICATIONS

Cert et al., "A Protocol for Packet Network Intercommunication", May 1974.*

2-page excerpt from IEEE 1588-2008, "Precision Clock Synchronization Protocol for Networked Measurement and Control Systems", published on Jul. 24, 2008, title page and p. 34.*

"Clock recovery based on packet inter-arrival time averaging", James Aweya et al., Feb. 28, 2005, Nortel Networks, p. 1696-1709.

* cited by examiner

MULTI INPUT TIMING RECOVERY OVER PACKET NETWORK

FIELD OF THE INVENTION

This invention relates to packet networks, and in particular to a method of recovering timing information over such networks.

BACKGROUND OF THE INVENTION

In timing recovery over packet networks dedicated timing packets are time-stamped by the transmitter's clock and then are sent over a packet network (PSN) to one or multiple receivers. At the receiver side, these timing packets, as they arrive, are time-stamped by the receiver clock. The difference between these two time stamps represents the relative delay between transmitter and receiver clocks, which can be used to synchronize the two clocks. FIG. 1 is an illustration of this for the case where there is one transmitter and one receiver. One of the main challenges in this synchronization approach is that the timing packets are subjected to packet delay variations (PDV) inherent in any packet networks. As a result, at the receiver side, depending on packet delay variations, the recovered reference clock will have high level of jitter and wander, which will not be acceptable for many applications, especially legacy services that assume a high quality level of synchronization.

To overcome this issue, it has been proposed to filter timing packets at the receiver such that only those timing packets that are least subjected to packet delay variations are used for clock recovery. Known methods generally rely only on a single stream of timing packets to synchronize the receiver with the transmitter.

SUMMARY OF THE INVENTION

Embodiments of the invention relate to a new synchronization method over packet switched networks, which exploits space diversity in timing packets originating from same clock source but arriving at the receiver though different network paths. In the proposed invention, for each stream, the time delay between the transmitter and receiver is calculated and filtered to minimize the effect of network packet delay variations on timing packets. The filtered time delay estimates for all streams are weighted and combined based on a non-linear function of residual error and sample rate at the output of time delay filter for each stream. Filtered time delays, combined in this fashion are then fed through a loop filter and digital controlled oscillator to recover transmitter clock. The main advantage of this approach is a significant performance improvement and robustness to packet impairment.

In IEEE 1588 standard relating to precise synchronization over packet networks, in addition to the timing packets sent by the transmitter to the receiver, the receiver also sends timing information (known as delay request) to the transmitter, which then will be relayed back to receiver (delay response). This process of timing packet exchange measures the round trip delay in network for calculating absolute time difference between transmitter and receiver. The timing packets sent by receiver and relayed back by transmitter can also be considered as a second stream of timing packets and can be used to improve single path delay measurement between transmitter and receiver.

This invention thus provides a method for clock synchronization over packet switch networks using spatial diversity in timing packet streams originating from same clock source and arriving at receiver through different network paths.

According to the present invention there is provided a method of recovering timing information over packet networks wherein a receiver receives a plurality of packet streams over different paths from the same source, comprising receiving timing packets from each stream; measuring the raw delays experienced by the timing packets for each stream; filtering the measured raw delays to account for network packet delay variations so as to provide a filtered delay for each stream; weighting the filtered delays based on the quality of each stream; combining the weighted filtered delays to form an aggregate delay estimate; and determining frequency adjustments from the aggregate delay estimate for a local clock at the receiver.

In one embodiment, for each timing packet stream, raw delays between transmitter and receiver are calculated. The raw delays are basically the difference between the transmitter time-stamps (included in timing packets) and the receiver time stamps, which are recorded at arrival time of each timing packet from the transmitter. For each stream the calculated time stamps are filtered to minimize the effect of network packet delay variations.

For each timing packet stream, a re-sampling circuit (RSC) is used to convert from a non-uniform sample rate (due to irregular arrival of timing packets) to a uniform sample rate. Another reason for using the re-sampling circuit is to adjust for difference in packet rate for each timing stream such that output sample rate for all timing streams are the same.

The outputs from previous stage are combined using a linear combiner. The coefficients of linear combiner are calculated using a non-linear function of the output residual error and packet rate of step.

The output of the linear combiner is passed through a loop filter to calculate the update value for a digitally controlled oscillator (DCO) which provides the output clock. Output of DCO is also used to time-stamp arrival time of timing packets.

According to a second aspect of the invention there is provided a timing recovery unit for recovering timing information over packet networks wherein a receiver receives a plurality of packet streams over different paths from the same source, comprising a block for receiving timing packets from each stream; a block for measuring the raw delays experienced by the timing packets for each stream; a filter for filtering the measured raw delays to account for network packet delay variations so as to provide a filtered delay for each stream; a weighting block for weighting the filtered delays based on the quality of each stream; a combiner for combining the weighted filtered delays to form an aggregate delay estimate; and a phase locked loop for outputting a local clock at the receiver using frequency adjustments determined from the aggregate delay estimate.

Embodiments of the present invention can provide a better estimate of the delay by exploiting multiple timing packet streams, and an inherent fault tolerance and robustness to packet impairment since if one of network paths fails to supply timing packets (due to network congestion, outage etc.) other timing paths can be used to maintain synchronization

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

In the following description k is index to packet number, $x_j(k)$ represents transmitter time stamp for timing packet k of timing packet stream j, $y_j(k)$ represents receiver time stamp for timing packet k of timing packet stream $z_j(k)$ is the raw delay estimate between transmitter and receiver for timing packet k of timing packet stream j, and $w_j(k)$ is the filtered raw delay for timing packet k of timing packet stream j.

Figure 1:
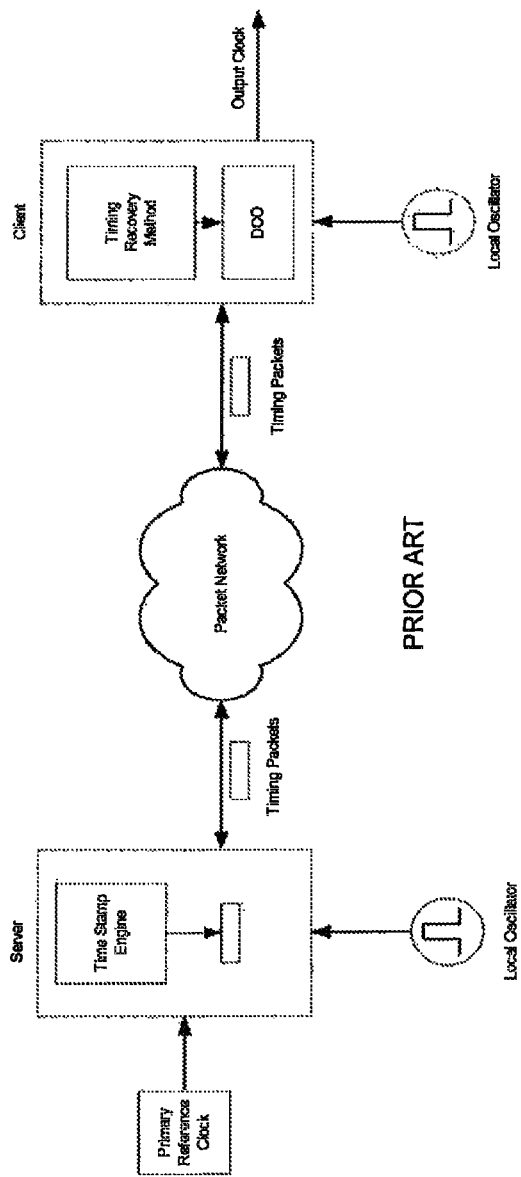
FIG. 1 is a high level diagram illustrating timing recovery over packet networks for a single transmitter and single receiver.
Figure 2:
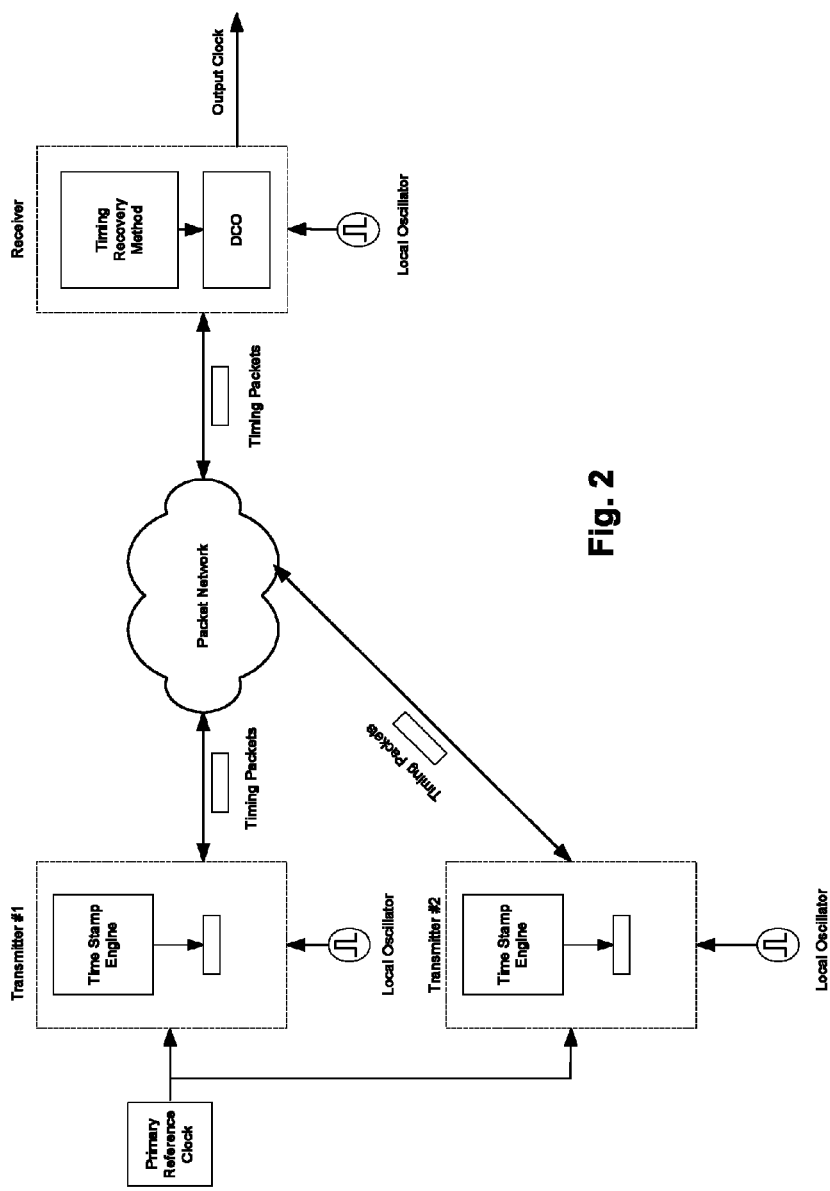
FIG. 2 illustrates an example of two transmitters with the same primary reference clock sending timing packets to one receiver.
Figure 3:
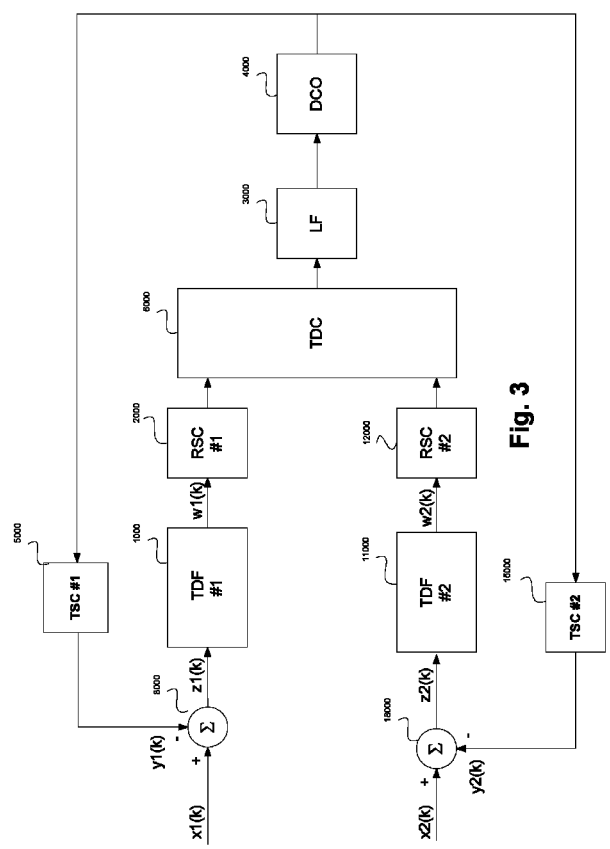
FIG. 3 is block diagram of an embodiment of the invention for case where there are two timing streams.

FIG. 3 is a block diagram of an embodiment of invention for the special case where there are only two timing packet streams derived from the same clock source and travelling over different paths as shown in FIG. 2, but it will be understood that the following description is applicable to the more general case of N timing packet streams.

For each stream j, raw delays (z(k)) are calculated by subtracting corresponding receiver local time stamps ($y_j(k)$) generated by time stamp circuits 5000 from corresponding time-stamps generated by transmitter ($x_j(k)$). The following can be written for the raw delays $$z_j(k) = \phi_j(k) + \xi_j(k) \quad (1)$$

where $\phi_j(k)$ represents the true delay between the transmitter and receiver for the k_th timing packet and stream j. $\xi_j(k)$ represents the error in measurement caused by network packet delay variations for k_th timing packet in stream j.

The calculated raw delays $z_j(k)$ are then filtered by an adaptive time delay filter method 1000. A suitable method is described in our co-pending application entitled "Timing Recovery Over Packet Networks" and filed on even date herewith, the contents of which are herein incorporated by reference. This filter minimizes error in time delay estimation between transmitter and receiver caused by network packet delay variations.

The following can be written for the output of block 1000 for timing packet stream j:

$$\omega_j(k) = \upsilon_j(k) + \phi_j(k) \quad (2)$$

where $\upsilon_j(k)$ represents the remaining residual error at the output of block 1000 for k_th packet and stream j.

The variance of $\upsilon_j(k)$ in combination with the output packet rate of the block 1000 represents the output quality of the block 1000 for stream j. It depends on the nature and magnitude of network packet delay variations and timing packet rate for each stream. Higher time packet rate and/or lower the network packet delay variations will result in better output quality for the block 1000. The statistical nature of network packet delay variation is also very important in determining output quality of the block 1000.

A weighting mechanism based on some non-linear function of residual error and packet rate is applied at the output of the block 1000 to combine the delay estimates from each timing stream to recover the transmitter clock.

For each stream, the timing packets can arrive at receiver at different rates. For example, for one stream it can be at 32 packets-per-seconds while for other stream it can be at 128 packets-per-second. Even if the average number of packets-per-second for all streams is the same, depending on network induced packet delay variations, the output sample rate for the block 1000 can be different for each stream. Another issue is that packets arrive at non-uniform time intervals and as a result the output of the block 1000 will be updated at non-uniform sample times asynchronously from other streams.

In order to take this into account, the block 2000 is used to convert non-uniform sample rates at the output of the block 1000 to the same uniform sample rate for all timing streams. The re-sampling circuit 2000 uses a linear interpolation of the output of the block 1000 and re-samples it at uniformly spaced intervals with the same sample rate for all timing streams.

The block 6000 is a time delay combiner which uses a weighted combination of all outputs of re-sampling circuits to form the best delay estimate between transmitter and receivers.

$R_j(n)$ j=1 . . . N represents the inputs to block 6000 corresponding to N timing streams. The output of block 6000 is calculated based on the following:

$$F(n) = \sum_{j=1}^{N} \beta_j^{-1}(n) R_j(n) \quad (3)$$

where F(n) is the output of block 6000 and $\beta_j(n)$ are weighting coefficients that are calculated periodically from time $t_{n-1}$ to time $t_n$ as described below.

$\beta_j(n)$ are calculated based on residual error $\ddot{\upsilon}_j(k)$ at the output of block 1000 for each timing stream j based on following:

2a) First calculate $$Q_j(n) = \frac{\sum_{k=1}^{M_j(n)} |v_j(k)|^4}{M_j^3(n)} \quad (4)$$

where $Q_j(n)$ represents output quality for timing stream j, M(n) represents number of filtered timing packets at the output of (1000) for stream j from time $t_{n-1}$ to $t_n$ and $\upsilon_j(k)$ is the residual error at the output of block 1000, which based on equation (2), is calculated from $$\upsilon_j(k) = \omega_j(k) - \phi_j(k) \quad (5)$$

In equation (5), since $\phi_j(k)$ is not known before hand, an estimated value, given by following equation, can be used instead.

$$\hat{\phi}_j(k) = \hat{\phi}_j(k-1) + \gamma_j(k)(x_j)(k) - x_j(k-1) \quad (6)$$

where $\gamma_j(k)$ is DCO update value at the time k_th timing packet arrived and $x_j(k)$ is the transmitter time stamp for k_th timing packet.

2b) Between $Q_1 \ldots Q_N$ find the one has maximum value; i.e., $$Q_{j_{max}} = \max(Q_j) \, j=1, \ldots, N \quad (7)$$

if $Q_{j_{max}} > Q_j \times T$ for all j=1 . . . N where T is the threshold value (e.g. T=2) then set $Q_{j_{max}} = 0$.

The above process can be repeated until all remaining $Q_j$ s have values close to each other. Using this process, the timing streams that have a much higher residual output error than the other streams will be eliminated.

2c) Based on the quality number given by equation (4), $\beta_j(n)$ are calculated from following $$\beta_j(n) = \frac{Q_j(n)}{\sum_{j=1}^{N} Q_j(n)} \quad (8)$$

where N is the total number of timing streams.

The output of block 6000 is passed through a loop filter 3000 to provide the update value for DCO 4000. The loop filter design can be similar to the one although other variants of loop filter can be used as well.

The frequency and phase of the digital controlled oscillator 4000 whose is adjusted based on its input value.

Block 5000 is the time stamp circuit (TSC) for the receiver and constitutes the feedback loop for the proposed timing recover method. In FIG. 3, there are two time stamp circuits corresponding to two timing streams. In general for each timing packet stream j there is one time-stamp circuit which will generate receiver time stamp values based on output value of DCO.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The described embodiment exploits the diversity present in the network and offers improved performance and reliability compared to a method based on single timing packet stream.

The invention claimed is:

1. A method of recovering timing information over a packet network, comprising:
   receiving a plurality of timing packets, each of the timing packets being derived from the same clock source and proceeding to a receiving block over a different path through the packet network, each of the timing packets being time-stamped with a transmitter time-stamp;
   time-stamping the received timing packets with a local time-stamp;
   arranging the timing packets received over different paths into a plurality of separate timing packet streams, each said timing packet stream corresponding to a different path through the network;
   measuring the raw delays experienced by each of the timing packets in each of the respective timing packet streams by determining the difference between the transmitter time-stamp and the local time-stamp;
   filtering the measured raw delays of the timing packets in each of the timing packet streams to account for network packet delay variations so as to provide a separate filtered delay for each of the respective timing packet streams;
   weighting the filtered delays based on the quality of each of the respective timing packet streams to produce a weighted filtered delay for each timing packet stream;
   combining the weighted filtered delays of the respective timing packet streams to form an aggregate delay estimate for all the timing packet streams; and
   determining frequency adjustments from the aggregate delay estimate for a local clock at the receiver, and
   wherein the weights of the individual timing packet streams are calculated based on a non-linear function of the packet rate and an estimated residual error for the filtered delay.

2. A method as claimed in claim 1, wherein the quality of each timing packet stream is determined by the variance of the timing packet delay and the packet rate for each timing packet stream.

3. A method as claimed in claim 1, wherein the aggregate delay estimate is determined in accordance with the formula:

$$F(n) = \sum_{j=1}^{N} \beta_j^{-1}(n) R_j(n)$$

where $\beta_j(n)$ are weighting coefficients, n is index to samples, N is the number of timing packet streams, F(n) is the best time delay estimate, and $R_j(n)$ is the filtered time delay output for the j_th timing packet stream.

4. A method as claimed in claim 3, wherein the weighting coefficients are calculated in accordance with the formula:

$$\beta_j(n) = \frac{Q_j(n)}{\sum_{j=1}^{N} Q_j(n)}$$

where $$Q_j(n) = \frac{\sum_{k=1}^{M_j(n)} |v_j(k)|^4}{M_j^3(n)}$$

where $M_j(n)$ represents the number of filtered timing packets for timing packet stream j from time $t_{n-1}$ to $t_n$ and $v_j(k)$ is the residual error calculated from $$v_j(k) = w_j(k) - \phi_j(k)$$

wherein $w_j(k)$ is the filtered time delay for the k_th packet and the j_th timing packet stream, and $\phi_j(k)$ is the true delay between transmitter and receiver for the k_th packet and the j_th timing packet stream.

5. A method as claimed in claim 4, wherein the aggregate delay estimate is passed through a loop filter to provide an update for a digital controlled oscillator that provides said local clock.

6. A method as claimed in claim 2, wherein the filtered measured raw delays for at least one of the plurality of timing packet streams are re-sampled to a uniform sampling rate so as to be common for all of the timing packet streams.

7. A method as claimed in claim 1, wherein the timing packets for each of the plurality of timing packet streams are filtered using a minimum statistics adaptive filter.

8. A timing recovery unit for recovering timing information over packet networks, comprising:
   a receiving block configured to receive a plurality of timing packets, each timing packet derived from the same clock source and proceeding to the receiving block over a different path through the packet network, the timing packets received over different paths being arranged into a plurality of separate timing packet streams, each said timing packet stream corresponding to a different path through the network, and each of the timing packets being time-stamped with a transmitter time-stamp;

a plurality of blocks, one for each timing packet stream, configured to measure the raw delays experienced by the respective timing packets in each timing packet stream;

a plurality of filters, one for each timing packet stream, configured to filter the measured raw delays of the timing packets in each timing packet stream to account for network packet delay variations so as to provide a separate filtered delay for each respective timing packet stream;

a plurality of weighting blocks, one for each timing packet stream, configured to weight the filtered delays in each timing packet stream based on the quality of each respective timing packet stream, and wherein the weighting block calculates the weights of the individual timing packet streams based on a non-linear function of the packet rate and an estimated residual error for the filtered delay;

a combiner for combining the weighted filtered delays of the respective timing packet streams to form an aggregate delay estimate for all the timing packet streams; and a controlled oscillator configured to output a local clock based on said aggregate delay estimate.

9. A timing recovery unit as claimed in claim 8, wherein the weighting block determines the quality of each timing packet stream based on the variance of the packet delay and the packet rate for each timing packet stream.

10. A timing recovery unit as claimed in claim 8, wherein the aggregate delay estimate is determined in accordance with the formula:

$$F(n) = \sum_{j=1}^{N} \beta_j^{-1}(n) R_j(n)$$

where $\beta_j(n)$ are weighting coefficients, n is index to samples, N is the number of timing packet streams, F(n) is the best time delay estimate, and $R_j(n)$ is the filtered time delay output for the j_th timing packet stream.

11. A timing recovery unit as claimed in claim 10, wherein the weighting coefficients are calculated in accordance with the formula:

$$\beta_j(n) = \frac{Q_j(n)}{\sum_{j=1}^{N} Q_j(n)}$$

where $$Q_j(n) = \frac{\sum_{k=1}^{M_j(n)} |v_j(k)|^4}{M_j^3(n)}$$

where $M_j(n)$ represents the number of filtered timing packets for timing packet stream j from time $t_{n-1}$ to $t_n$ and $v_j(k)$ is the residual error calculated from $$v_j(k) = w_j(k) - \phi_j(k)$$

wherein $w_j(k)$ is the filtered time delay for the k_th packet and the j_th timing packet stream, and $\phi_j(k)$ is the true delay between transmitter and receiver for the k_th packet and the j_th timing packet stream.

12. A timing recovery unit as claimed in claim 11, further comprising a loop filter for filtering the aggregate delay estimate to provide an update for said controlled oscillator.

13. A timing recovery unit as claimed in claim 8, further comprising a re-sampler for re-sampling the filtered measured raw delays of the at least one of the plurality of timing packet streams to a uniform sampling rate so as to be common for all of the timing packet streams.

14. A timing recovery unit as claimed in claim 8, further comprising a minimum statistics adaptive filter for filtering the timing packets for each timing packet stream.

\* \* \* \* \*